(12) United States Patent
Micco (10) Patent No.: US 6,692,058 B1
(45) Date of Patent: Feb. 17, 2004

(54) GOLF CART CANOPY FOR WEATHER PROTECTION

(76) Inventor: Robert E. Micco, 764 Sandalwood La., Chagrin Falls, OH (US) 44023

(*) Notice: Subject to any disclaimer, the term of this patent is extended or adjusted under 35 U.S.C. 154(b) by 79 days.

(21) Appl. No.: 10/097,889

(22) Filed: Mar. 13, 2002

Related U.S. Application Data
(60) Provisional application No. 60/275,368, filed on Mar. 13, 2001.

(51) Int. Cl.[7] .............................. B60J 1/18; B60J 7/047; B62D 25/13
(52) U.S. Cl. .................. 296/77.1; 296/83; 296/100.03; 296/138; 135/88.01; 280/DIG. 5
(58) Field of Search .......................... 296/77.1, 83, 79, 296/86, 100.03, 100.04, 138, 145; 280/DIG. 5; 135/87, 88.01, 88.05, 88.07, 88.09

(56) References Cited

U.S. PATENT DOCUMENTS

| | | | | |
|---|---|---|---|---|
| 1,395,129 A | * | 10/1921 | McCorkindale | 296/100.04 |
| 1,712,363 A | * | 5/1929 | Sparshatt | 296/100.04 |
| 3,671,071 A | | 6/1972 | Evinrude | 296/69 |
| 3,709,553 A | * | 1/1973 | Churchill et al. | 296/145 |
| 3,773,380 A | * | 11/1973 | Stockdill | 296/100.04 |
| 4,008,874 A | | 2/1977 | Conway, Jr. | 248/534 |
| 4,013,315 A | * | 3/1977 | West | 296/83 |
| 4,037,614 A | | 7/1977 | Hines et al. | 135/5 A |
| 4,098,536 A | | 7/1978 | Mills | 296/78 R |
| 4,332,415 A | * | 6/1982 | Williams | 296/213 |
| 4,795,205 A | * | 1/1989 | Gerber | 296/77.1 |
| 4,830,037 A | | 5/1989 | Held | 135/88 |
| 5,217,275 A | * | 6/1993 | Ridge | 296/77.1 |
| 5,393,118 A | * | 2/1995 | Welborn | 296/147 |
| 5,588,690 A | * | 12/1996 | Showalter | 296/77.1 |
| 5,741,041 A | * | 4/1998 | Sullivan | 135/88.09 |
| 6,007,134 A | * | 12/1999 | Weston | 296/83 |
| 6,216,714 B1 | * | 4/2001 | Tucker | 135/88.01 |
| 6,220,647 B1 | * | 4/2001 | Winkler | 296/100.14 |
| 6,227,217 B1 | * | 5/2001 | Peta | 135/88.03 |
| 6,416,109 B1 | * | 7/2002 | Tyrer et al. | 296/100.11 |

FOREIGN PATENT DOCUMENTS

DE           3517967 A1      11/1985

* cited by examiner

*Primary Examiner*—Dennis H. Pedder
*Assistant Examiner*—Paul Chenevert
(74) *Attorney, Agent, or Firm*—Fay, Sharpe, Fagan, Minnich & McKee, LLP (57) ABSTRACT

A golf cart canopy attachment includes a shield which has a pair of guide channels formed on a top surface. A raised portion or dormer is formed between the channels. The channels engage corresponding guide channels in a golf cart roof to enable the shield to slide with respect to the roof. A pair of locking grooves are formed on the shield for preventing further movement in either a fully extended or fully retracted position. Stop blocks are provided on side walls of the shield to prevent further outward movement of the shield in the fully open position. A rod extends from an underside of the shield from which a pair of curtains extends. The curtains are moved along the rod on opposite sides to be connected together when the shield is in the fully opened position. When a shield is in a closed position, the curtains are pulled back to stored positions and fastened onto roof supports at the rear of the roof.

27 Claims, 7 Drawing Sheets

GOLF CART CANOPY FOR WEATHER PROTECTION

CROSS-REFERENCE TO RELATED APPLICATION

This application claims the benefit of application Ser. No. 60/275,368 filed Mar. 13, 2001.

BACKGROUND OF THE INVENTION

Motorized carts for transporting occupants thereof have become very popular in recent years and such carts are employed primarily by golfers, although such carts have also been employed by policemen in the performance of their duties, invalid persons unable to walk any great distance, etc. Usually such carts are so constructed as to enable two persons to occupy each cart and a seating area is provided for the occupants of the cart. A storage area is provided rearwardly of the seat area which receives and retains equipment such as a bag and golf clubs of a golfer.

At present, some cart manufacturers provide a motorized cart with a canopy or roof which extends over the occupants of the cart so as to protect them from the elements. However, such a canopy is typically mounted in a fixed position on the cart and a cart frame must be modified to support the canopy. Also, such canopies do not extend over the storage area for the golf clubs.

The type of golf cart with which this invention is concerned includes a rear compartment into which golf club bags and clubs are positioned during use of the cart. Commonly, the rear compartment of the cart is uncovered, even if the cart includes a roof or canopy section for covering the seating compartment of the cart. Hence, the golf bags and clubs positioned in the rear compartment of the cart are unprotected from weather precipitation, such as rainfall. In as much as a golfer's grip on his clubs, hence his game, can be adversely affected if the grips of his clubs become wet, it would be desirable to provide protection for his bag and clubs from weather precipitation while the bag and clubs are positioned in the rear compartment of a golf cart. Existing canopy attachments are provided which are added to existing golf cart canopies. These attachments are typically expensive to fabricate and are cumbersome to use. Moreover, the attachments are not able to be easily integrated into the canopy structure and are typically physically unattractive.

With the above in mind, it is a primary object of the invention to provide an attachment to a golf cart canopy which will extend over the golf clubs and bags and may be easily retracted and extended to allow protection of the golf clubs and access to the clubs. Thus, the occupants of the cart as well as the golf clubs in a storage area would be protected from the elements.

Another object of the present invention is to provide an attachment that is inexpensive to fabricate and is easy to integrate into an existing canopy design.

Accordingly, it is desirable to develop a new and improved golf cart canopy which would overcome the foregoing difficulties and provide better and more advantageous overall results.

BRIEF SUMMARY OF THE INVENTION

The present invention relates to an extendable canopy attachment for the rear of a golf cart which is extendable and retractable over the rear compartment into which golf bags and clubs are stored.

The golf cart canopy attachment includes a shield which retracts within a recess in an underside of a golf cart roof. The shield includes a pair of curtains which are mounted along side and rear edges of the shield via a rod and hook system or a track system. The curtains may be extended or pulled along the length of the sides to the rear of the shield into contact with each other and are fastened to each other using suitable fastening means. When not in use, the curtains are pushed or pulled into storage positions on the opposed sides of the shield and are held in place by fastening means to rear roof supports.

The shield may be used in a fully extended or partially extended position. In the fully extended or open position, the shield is pulled out until stop members on the shield prevent further movement of the shield. The shield is then cantilevered and extends over the golf clubs stored in the rear of the cart.

The curtains are then pulled together and fastened to each other using fastening means. To access a golf club, the curtains are unfastened and one of the curtains pushed apart from the other curtain and the shield is partially retracted within the recess of the golf cart roof. This allows protection of the clubs from the elements as well as easy access to the clubs. The shield can be fully extended over the clubs after a club is selected. The curtains are drawn together again and refastened using the fastening means. Alternately, the shield may also be fully retracted into the recess when not in use. The curtains are then both pushed to the sides and pulled into a storage location on opposing sides of the golf cart and held in place using fastening means.

The shield is easy to move between extended and retracted positions. The curtains are also easy to move from a stored position to a fastened together position. Furthermore, the shield can be easily retrofitted onto existing golf cart roofs or canopies.

In particular, the golf cart canopy of the preferred embodiment includes a shield member having a body with first and second ends, first and second surfaces and first and second side members extending between the first and second ends. An elongated support is secured to the second surface of the shield and extends from the first end to the second end. Protective covers or curtains are each selectively secured to and extend from the elongated support using fastening means such as hook and loop fasteners. A stop member is secured to each side member of the shield for preventing movement of the shield with respect to the canopy roof. A pair of locking grooves in the first surface extend laterally between the two side members of the shield. First and second channels extend from the first surface between the first and second ends. A raised portion is formed between the two channels. A handle extends from the second end of the shield. Additional grooves across the first surface serve as rain gutters or drains for the shield.

The golf cart roof or canopy comprises a body with first and second ends and a raised portion extending between the first and second ends. The raised portion has first and second parallel walls and first and second guide channels which are removably secured to the walls. A locking groove is laterally disposed between the first and second walls of the raised portion. The shield slides with respect to the roof through engagement of the shield first and second channels with the first and second guide channels of the canopy. The stop members contact the wall extending along a perimeter of the canopy second surface. One of the shield locking grooves matingly engages with the canopy locking channel in one of the fully extended or fully retracted positions.

The curtains comprise fastening ties for securing the curtains in a stored position. The curtains also have fastening means such as hook and loop fasteners extending along an edge of the curtains which used to secure the curtains to each other. The shield further comprises sound-deadening material adjacent to the channels to minimize noise as the shield is moved with respect to the roof.

A principle advantage of the present invention resides in a provision of a golf cart canopy attachment which extends and retracts from an existing golf cart roof to provide protection for golf club bags and clubs.

Another advantage of the invention resides in the provision of the golf cart canopy attachment which is inexpensive to fabricate and is easy to integrate into a golf cart roof design.

Yet another advantage of the present invention is provision of a golf cart canopy attachment having a shield which is easy to move between extended and retracted positions.

Still another advantage of the present invention is provision of a golf cart canopy shield which can be easily retrofitted on existing golf cart roofs or canopies.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in the specification and illustrated in accompanying drawings which form a part hereof and wherein.

DETAILED DESCRIPTION OF THE PREFERRED EMBODIMENT

Figure 1:
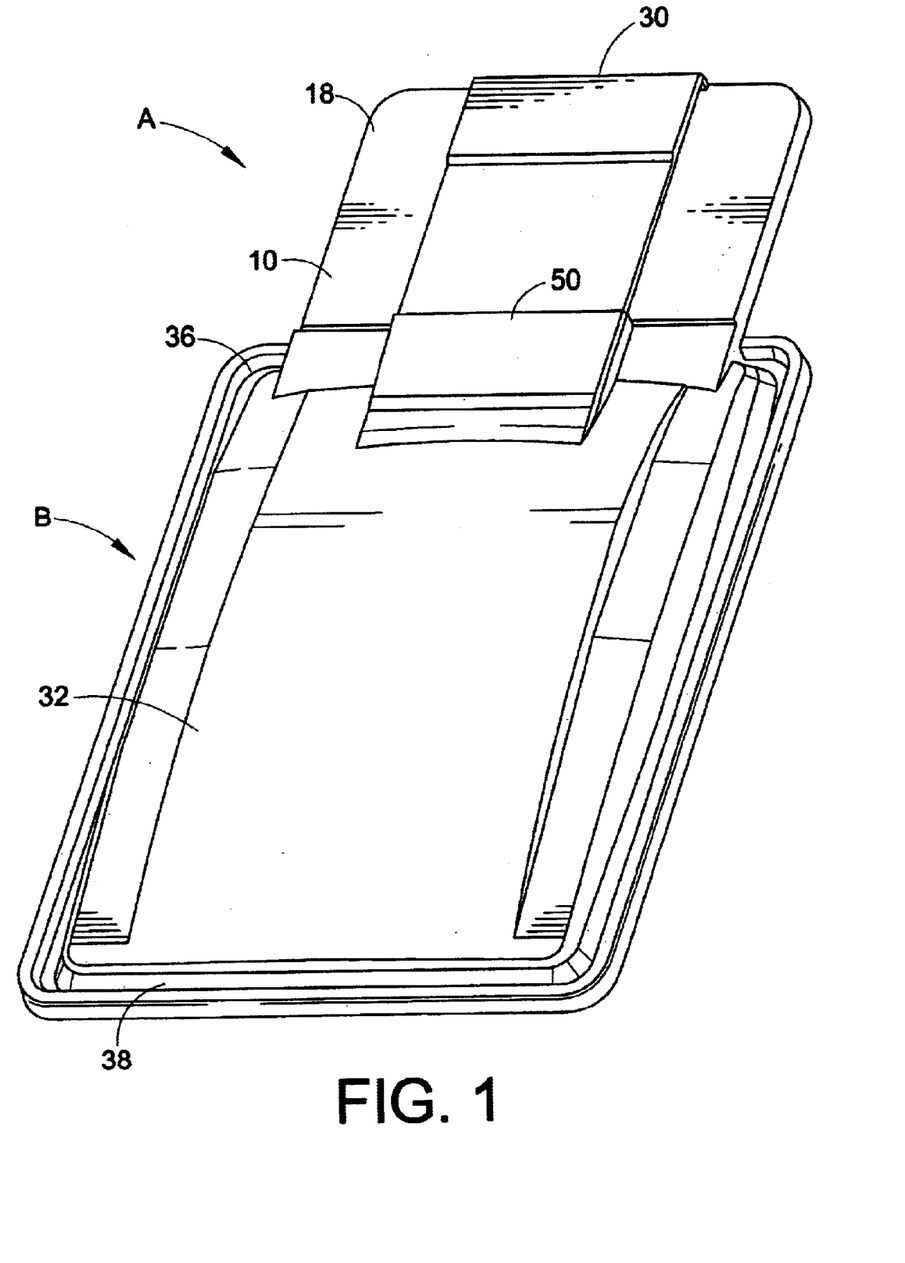
FIG. 1 is a perspective view of a golf cart roof and an extended canopy attachment in accordance with a preferred embodiment of the present invention.

Referring now to the drawings wherein the showings are for purposes of illustrating one embodiment of the invention only and all for purposes illuminating same, FIG. 1 illustrates a golf cart canopy attachment A according to the present invention. The golf cart canopy attachment A comprises a shield 10 which is preferably fabricated from plastic or high density polyethylene. The golf cart canopy attachment extends from a golf cart roof B.

Figure 2:
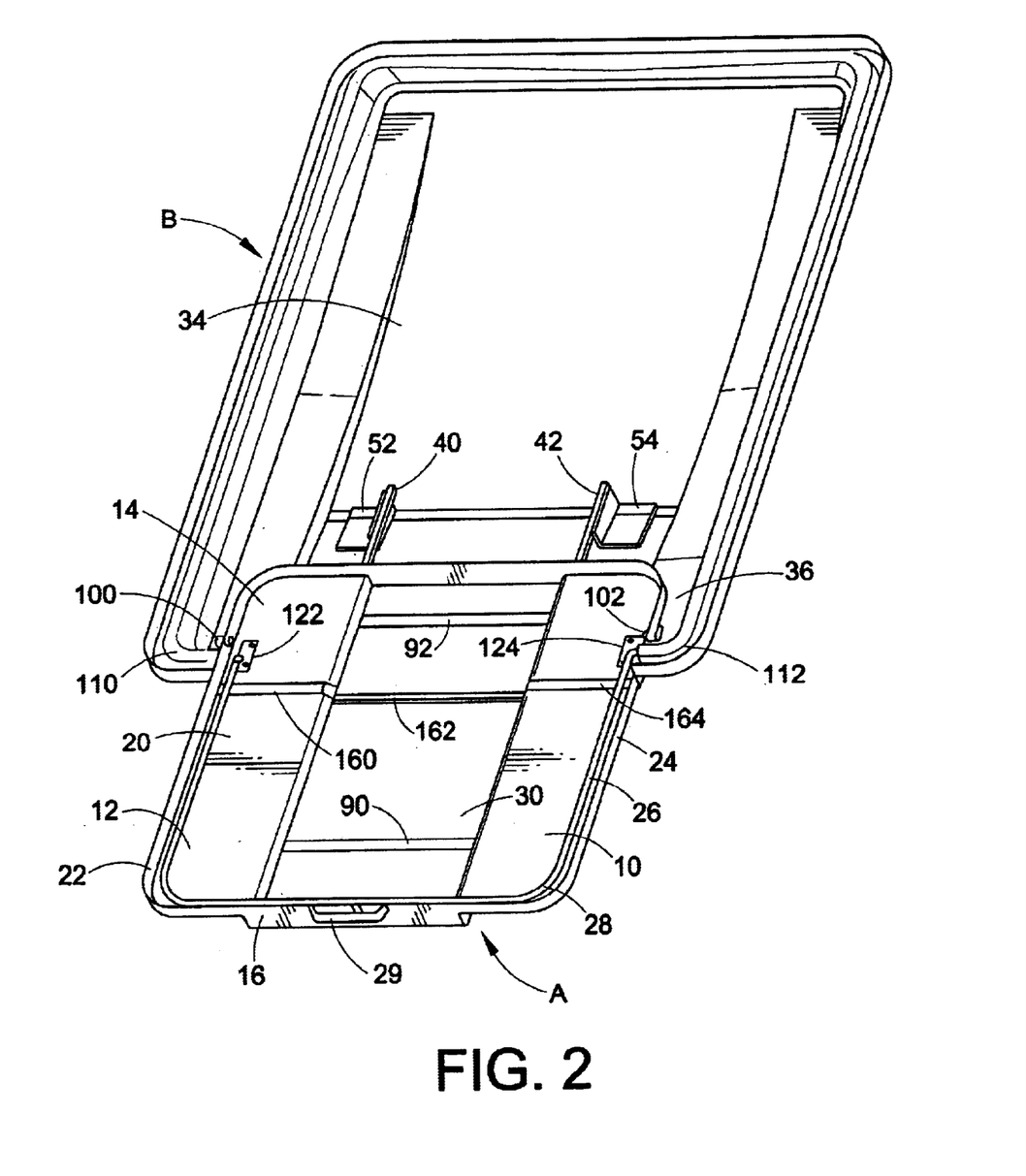
FIG. 2 is a perspective view of the underside of the golf cart roof and the canopy attachment with canopy attachment in the extended position.

The shield 10 has dimensions to fit snugly under the center rear of golf cart roof B when not in use. Referring to FIGS. 1 and 2, shield 10 has a body 12 including a first end 14 and a second end 16 and a first or top surface 18, and a second or bottom surface 20. First and second side members or walls 22, 24 extend between the first and second ends 14, 16 and are parallel to each other. A rod and hook system 26 includes an elongated support 28, such as a rod, which is secured to the second surface 20 and extends from the first end 14 to the second end 16. A handle 29 is formed in second end 16 for pulling the shield 10.

The shield 10 can be vacuum formed or rotationally molded from high density polyethylene. A center raised portion 30 is stepped up and recessed and undercut on each side to create an engagement and sliding feature.

Figure 3:
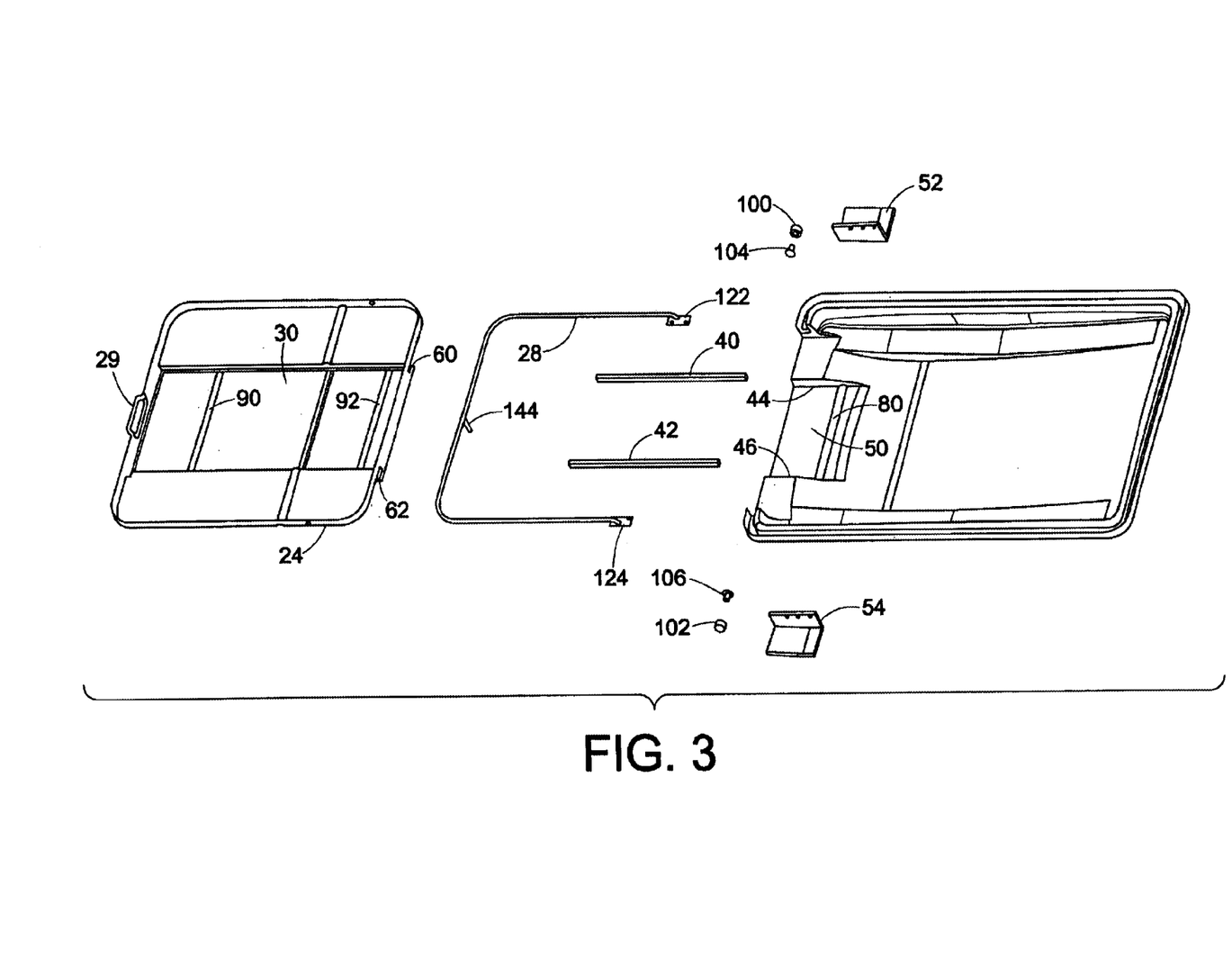
FIG. 3 is an exploded perspective view of the golf cart roof and canopy attachment.
Figure 5:
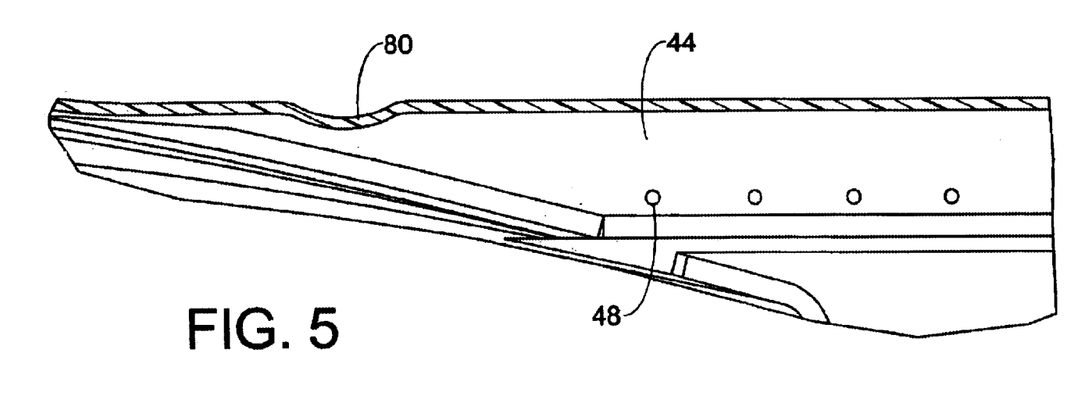
FIG. 5 is an enlarged side elevational view and partial cross-section illustrating a shield guide channel mounting wall and a locking groove of the golf cart roof.

As seen in FIGS. 1 and 2, golf cart roof B comprises first and second surfaces 32, 34 and first and second ends 36, 38. Spaced apart guide channels 40, 42 are located on the second surface 34 of the roof B. Referring to FIGS. 2 and 3, the guide channels 40, 42 are parallel to each other and are secured to the golf cart roof B by bolts or other fasteners through mounting holes in side walls 44, 46 which are parallel to each other and spaced apart on an underside of the roof B. The side walls 44, 46 form a dormer or raised portion 50 extending from the roof first surface 32. As shown in FIG. 5, each side wall 44, 46 includes guide channel mounting holes 48 which are equally spaced apart and which align with corresponding mating holes in a first end of the guide channels 40, 42. Referring to FIGS. 2 and 3, on a second end of the guide channels 40, 42, additional mounting holes are used to secure the guide channels 40, 42 to the underside of the golf cart roof B by mounting brackets 52, 54. The mounting brackets 52, 54 also have mounting holes therein and are substantially L-shaped.

Figure 4A:
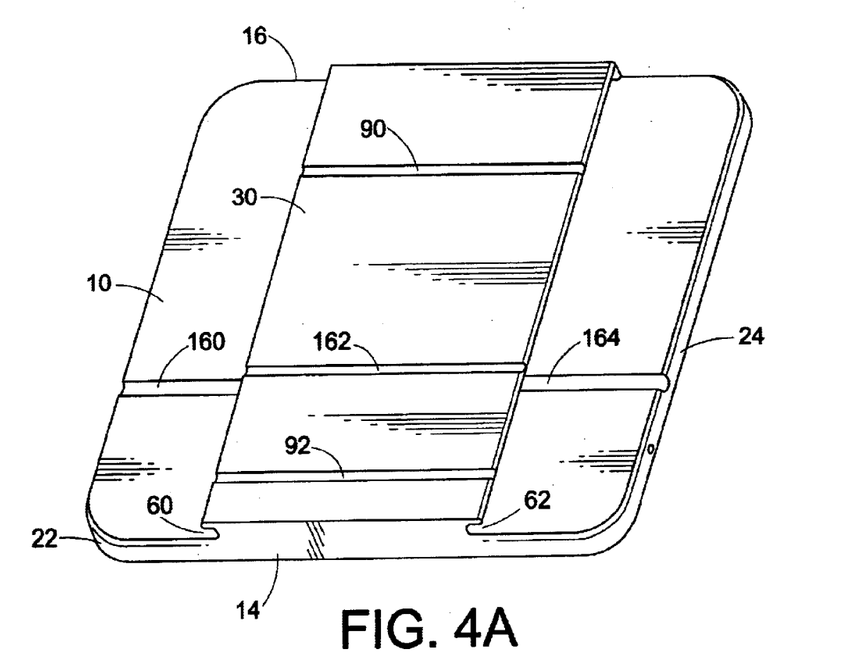
FIG. 4A is a perspective view of the shield.
Figure 4B:
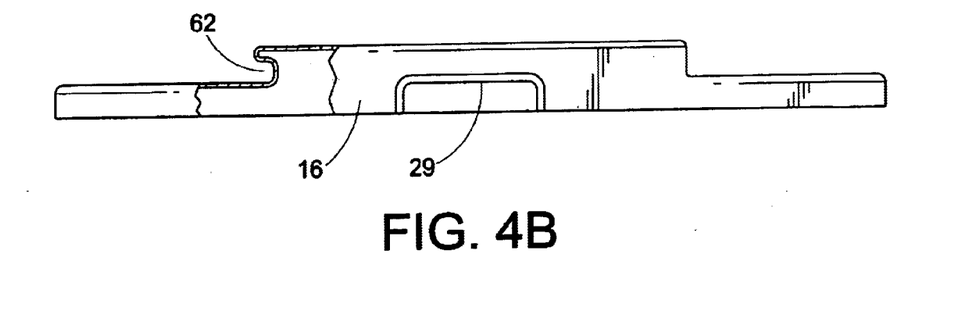
FIG. 4B is a side elevational view in partial cross section illustrating a C-shaped channel of the shield.

Referring now to FIGS. 4A and 4B, the shield 10 includes a pair of parallel guide channels 60, 62 which are substantially C-shaped and matingly engage with and slide along the guide channels 40, 42 of the roof B. The guide channels 60, 62 are integrally molded into the shield body 12 and are formed on opposing sides of center portion 30. As seen in FIG. 2, the shield 10 is held in position with respect to the golf cart roof B through the engagement of the shield and roof channels 60, 62, 40, 42. The roof B guide channels 40, 42 extend through the C-shaped portions of the shield channels 60, 62. The shield channels 60, 62 thus interface with and slide along the roof guide channels 40, 42. When in use, a cantilevered position of the shield 10 is supported by the remaining portion of the shield channels 60, 62 which remain in engagement with the guide channels 40, 42 of the roof.

The shield channels 60, 62 and raised portion 30, along with dormer 50 of the roof B, also provide adequate headroom for the driver and passenger, when the shield 10 is not employed. The guide channels 60, 62 allow the shield 10 to slide past the rear of the roof B, over the golf bag rack and remain there when in use. The shield 10 extends over the golf club rack a sufficient amount (typically about 20 inches) to protect and cover the clubs 170 when fully extended.

Figure 6:
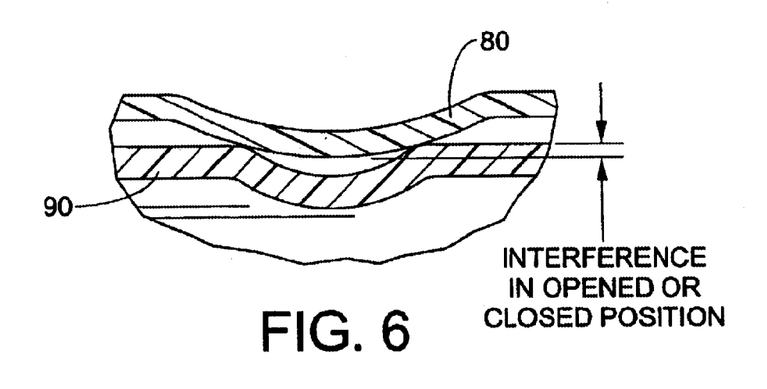
FIG. 6 is an enlarged side elevational and cross section illustrating the roof locking groove in an interference fit with a shield locking groove.

Extending laterally across the dormer or raised portion 50 of the roof B is a locking groove 80. As shown in FIG. 5, the locking groove 80 comprises a curved groove or indention which extends across the underside of the golf cart roof B between guide channels 40, 42. The shield 10 has spaced apart parallel locking grooves 90, 92 located across the raised portion 30 of the shield 10 for locking the shield 10 in fully extended and fully retracted positions with respect to the cart roof B. The locking grooves 90, 92 extend laterally between channels 60, 62. One of the locking grooves 92 is positioned adjacent first end 14 of the shield 10 while the other locking groove 90 is positioned adjacent the second end 16. As shown in FIG. 6, there is a slight interference during engagement between a shield 10 locking groove 90, 92 and the roof locking groove 80, thus preventing further inward or outward movement of the shield 10. In a fully extended or open position, locking groove 92 engages the locking groove 80 of the roof B to prevent further outward movement of the shield 10. Similarly, in the fully retracted or closed position, locking groove 90 engages the roof groove 80 to prevent further inward movement of the shield 10.

Referring to FIGS. 2 and 3, stop members or blocks 100, 102 are provided in side members 22, 24 of the shield 10 to prevent the shield 10 from traveling beyond a fully extended position. Blocks 100, 102 are held in place by screws 104, 106. The stop blocks 100, 102 engage walls 110, 112 extending from the second surface 34 of the roof B. The stop blocks 100, 102 serve as a back up to ensure that the shield 10 does not move beyond the fully extended position.

Referring to FIGS. 2 and 3, elongated support 28 is fabricated from stainless steel or another weather resistant material and is suspended from the underside 20 of the shield 10 near its outer two side members 22, 24 and second end 16. The elongated support 28 is secured in place by mounting or fastening plates 122, 124 using suitable fasteners (not shown). The elongated support 28 is generally U-shaped and extends from the first end 14 of the shield 10 to the second end 16.

Figure 7:
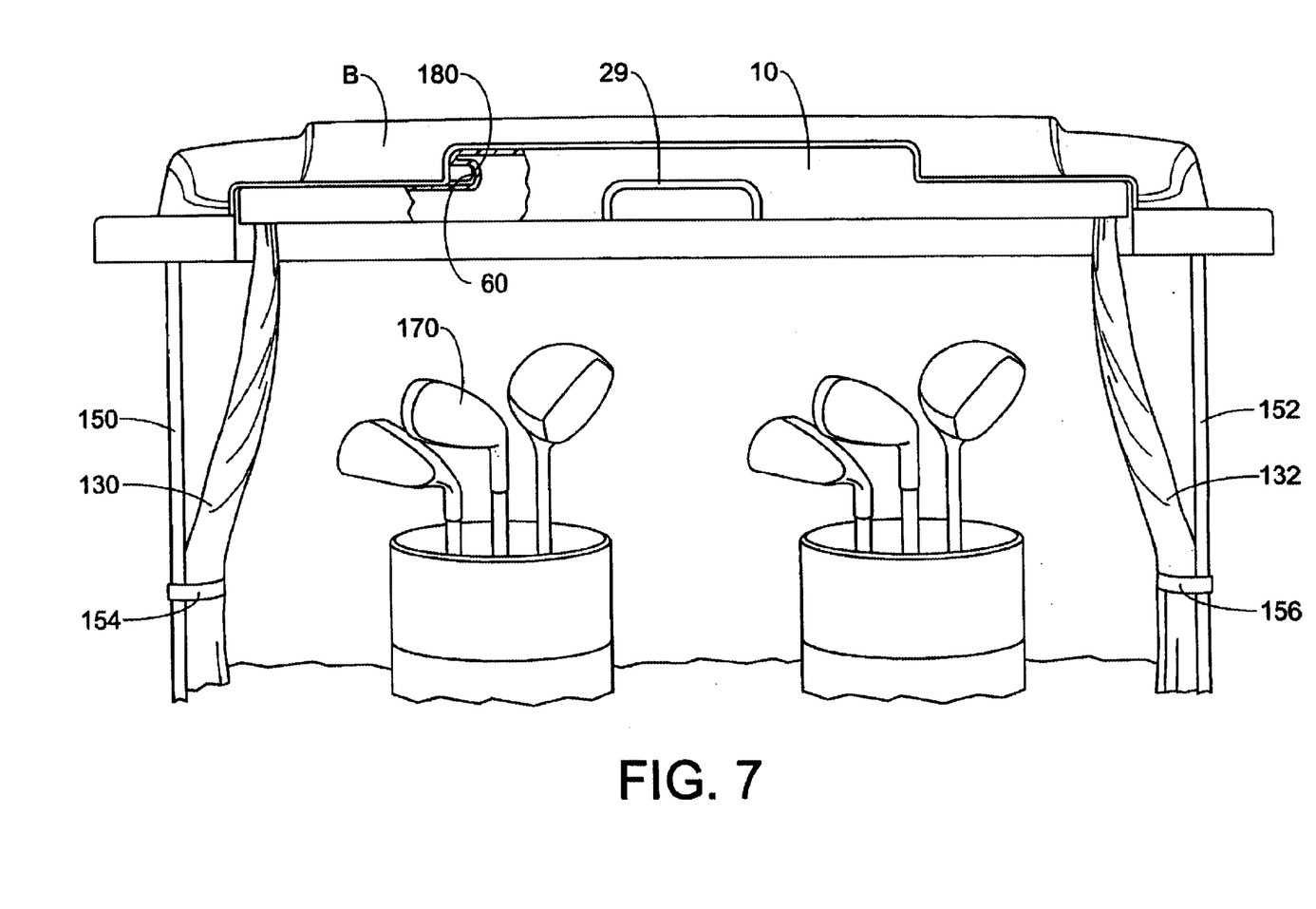
FIG. 7 is a front elevational view illustrating the curtains in a stored and retracted position; and, FIG. 8 illustrates the shield in an extended position with curtains extended and fastened into place to protect golf clubs.
Figure 8:
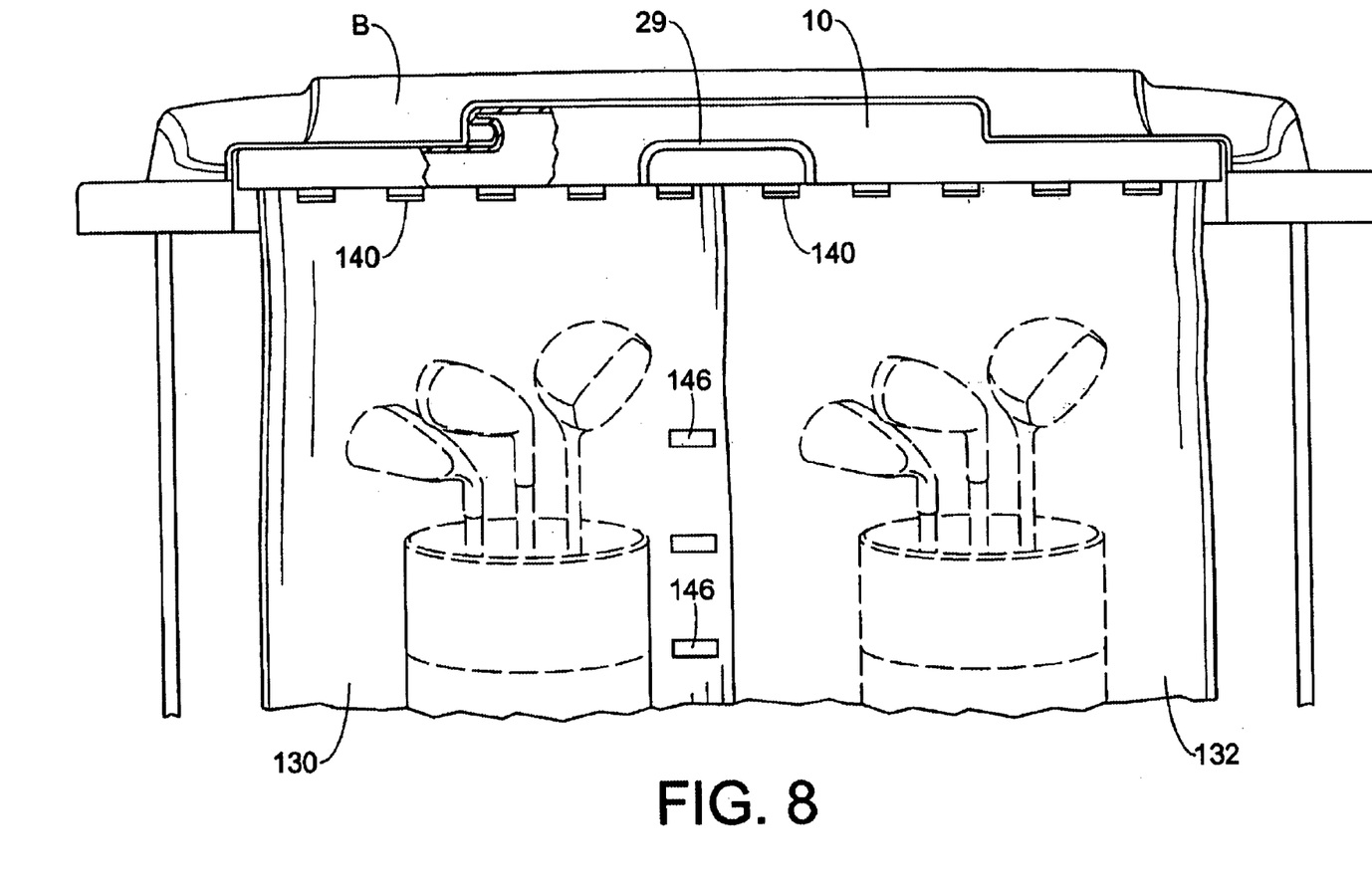

As shown in FIGS. 7 and 8, protective covers or curtains 130, 132 are hung from the elongated support 28. The curtains 130, 132 are made from an awning or other ultraviolet (UV) and moisture resistant material. Each curtain 130, 132 is hung from and along the elongated support 28 by fastening means such as a hook and loop band 140 spaced apart at equal intervals. When in use, the curtains 130, 132 hang down a sufficient amount (about 18 inches) so that no rain can enter the top of the golf bags on three sides of the shield 10.

At each rear corner of the shield 10, the elongated support or rod 28 turns about 90 degrees in approximately a three (3) inch radius. The elongated support 28 is also supported in the center rear with vertical support 144 extending from the elongated support 28. The curtains 130, 132 are drawn along the elongated support 28 along the perimeter of the at shield 10 toward each other and then are fastened in the center of the rear edge of the shield 10, completely enclosing a top portion of the club bag rack. This serves to protect the clubs 170 and a top portion of the golf club bags. Each curtain 130, 132 further has a plurality of fasteners 146 extending along an edge of the curtain 130, 132 which interacts with or overlaps the edge of the other curtain 130, 132.

As shown in FIGS. 7 and 8, when the shield 10 is fully retracted, each curtain 130, 132 is stored or anchored to a roof frame support 150, 152, respectively, toward the rear of the cart by wrapping the curtain 130, 132 end and holding it into place by a fastening strip 154, 156 (such as hook and loop bands or other suitable fastening devices) located at the supports 150, 152.

Additional grooves 160, 162, 164 are formed between side members 22, 24 on the first surface 18 of the shield 10. These grooves 160, 162, 164 serve as rain gutters and would just be exposed to the weather immediately beyond the rear edge of the roof B when the shield 10 is in the fully extended or open position. The grooves 160, 162, 164 keep water from running back from the first or top surface 18 of the shield 10 to the bottom or second surface 34 of the roof B.

To use a shield 10, the fastening strips 154, 156 are undone, to release each curtain 130, 132 from its respective roof support 150, 152. As shown in FIG. 1 and FIG. 8, the shield 10 is manually pulled into place over the golf bag compartment into a fully opened or operative position. In this position, locking groove 92 engages locking groove 80 of the roof B. Furthermore, the stop blocks 100, 102 prevent further outward movement of the shield 10 with respect to the roof B. Each of the curtains 130, 132 is then drawn to the center of the second or rear end 16 of the shield 10. One of the curtains 130 is pulled to overlap the other curtain 132 (one curtain can be slightly longer than the other curtain) and then the curtains 130, 132 are attached to each other using a fastening means or strip contacts 146 located at the top, center and bottom of the edge of the curtains 130, 132. Golf clubs 170 in the bags are then protected from the elements. Each curtain 130, 132 moves along approximately half of the U-shaped rod 28 from one of the rear supports 150, 152 to the center of the rear end 16 of the shield 10.

To access one of the golf clubs 170, such as in rain conditions, the shield 10 may be retracted to a partially opened or operative position. Thus, the clubs 170 will still be protected from the elements while the players were able to remove or access the clubs 170 from the golf cart. The curtains 130, 132 are separated by releasing or undoing the fastening means 146 (i.e., pulling apart hook and loop strips or snap buttons) which connected the two curtains 130, 132 to each other. Then the curtains 130, 132 are partially separated by pushing one of the curtains 130 away from the other curtain 132. The other curtain 132 remains in place. Accordingly, one set of golf clubs 170 may be accessed while the other set is still protected by the curtain 132 which remains in place. The shield 10 may then be partially retracted by being manually pushed inwardly toward the roof portion B of the golf cart. The player then removes or replaces a golf club 170. The shield 10 is then pulled outwardly to a fully opened position over the top of the golf clubs 170, as shown in FIG. 8. The curtains 130, 132 are then pulled back into a closed, overlapping position. The curtains 130, 132 are then refastened using the fastening means 146. Alternately, the shield 10 may remain in a fully extended position to remove the golf clubs 170. The curtains 130, 132 are unfastened and then pulled to the sides of the shield 10 to access the clubs 170. Once the club 170 is accessed, the curtains 130, 132 are then drawn back together and refastened.

To replace a golf club 170, the curtains 130, 132 are unfastened and then the shield 10 is pushed in slightly toward the roof B. The club 170 is replaced and then the shield 10, is pulled outwardly to the fully extended position. The curtains 130, 132 are then pulled again into the overlapping position and are fastened using fastening means such as strip contacts 146.

To store the shield 10, the curtains 130, 132 are unfastened by releasing the fastening means 146. Then, the curtains 130, 132 are pulled or pushed to their storage positions or the rear roof supports 150, 152 while the shield 10 is pushed toward the roof B to a fully retracted or stored position. The shield 10 is locked into the retracted position by engagement of the lock groove 90 with roof locking groove 80. Then, the curtains 130, 132, are secured into their stored positions by wrapping the fastening bands 154, 156 around the roof supports 150, 152 as shown in FIG. 7.

When in use, a portion of the curtains 130, 132 hanging from the rear 16 of the shield 10 can include a section of clear vinyl to reveal the position of any club 170 to help allow selection. A sound proofing material 180 such as a hook and loop type material may be provided around the guide channels 40, 42 of the roof B to minimize noise during vibration of the shield 10 with respect to the roof B while the golf cart is in motion. The hook and loop material or other dampening material 180 would be provided around the channels 40, 42 and within the C-shaped channels 60, 62 of the shield 10.

The invention has been described with reference to preferred embodiment. Obviously, alterations and modifications will occur to others upon a reading and understanding of the specification. It is intended to include all such modifications and alterations in so for as they come within the scope of the appended claim with the equivalents thereof.

Having thus described the preferred embodiment, the invention is now claimed:

1. A golf cart canopy attachment comprising:
   a shield having first and second ends, first and second surfaces, and first and second side members extending between the first and second ends;

an elongated support secured to said shield and extending between said first and second ends;

a protective cover secured to said support;

a first groove in said first surface extending laterally between said shield side members; and, a first channel extending along said first surface between said shield first and second ends.

2. The golf cart canopy of claim 1, further including first and second stop members disposed at said shield side members.

3. The golf cart canopy attachment of claim 1, further including a handle disposed at said shield second end.

4. The golf cart canopy attachment of claim 1, wherein said support is generally U-shaped.

5. The golf cart canopy attachment of claim 1, wherein said support is comprised of a weather resistant material.

6. The golf cart canopy attachment of claim 1, further including a second groove in said first surface extending laterally between said shield side members.

7. The golf cart canopy attachment of claim 1, further including a second channel extending along said first surface between said shield first and second ends, said first and second channels being laterally spaced apart and extending generally parallel to each other.

8. The golf cart canopy attachment of claim 7, wherein said shield first surface further includes a raised portion intermediate said first and second channels.

9. The golf cart canopy attachment of claim 1, wherein releasable fasteners secure said protective cover to said support.

10. The golf cart canopy attachment of claim 9, wherein said releasable fasteners comprise hook and loop fasteners.

11. The golf cart canopy attachment of claim 9, wherein said protective cover comprises a pair of curtains constructed from a moisture resistant material.

12. A golf cart canopy system comprising;

a roof comprising:
 a roof body having a first surface and a second surface, said first surface having a raised portion comprised of first and second parallel spaced apart walls,
 first and second guide channels removably secured to said first and second walls,
 at least one locking groove laterally disposed between said first and second walls of said raised portion; and, a shield comprising:
 a shield body having a first end, a second end, first and second side members extending between said ends, and first and second surfaces between said first and second ends;
 a support secured to said second surface and extending between said first and second ends;
 first and second locking grooves extending laterally between said shield side members;
 first and second stop members extending from said shield side members; and,
 first and second guide channels extending from said shield first surface between said first and second ends.

13. The golf cart canopy system of claim 12, further comprising a handle extending from said shield second end.

14. The golf cart canopy system of claim 12, wherein said shield slides with respect to said roof through engagement of said shield first and second guide channels with said roof first and second guide channels.

15. The golf cart system of claim 12, wherein said stop members contact a wall extending along said roof second surface.

16. The golf cart canopy system of claim 12, wherein said roof further comprises mounting brackets for securing said roof guide channels to said roof.

17. The golf cart canopy system of claim 12, wherein said roof first and second walls each have spaced apart mounting holes for mounting said roof guide channels to said roof.

18. The golf cart canopy system of claim 12, wherein said shield comprises high density polyethylene.

19. The golf cart canopy system of claim 12, wherein said rod is substantially U-shaped.

20. The golf cart canopy system of claim 12, wherein said shield further comprises at least one drain channel extending between said first and second side members.

21. The golf cart canopy system of claim 12, wherein one of said shield locking grooves matingly engages with said roof locking groove in one of a fully retracted or fully extended position.

22. The golf cart canopy system of claim 21, wherein said shield further comprises a sound dampening material positioned adjacent to each of said shield guide channels to minimize noise as said shield is moved with respect to said roof.

23. The golf cart canopy system of claim 12, further comprising a protective cover secured to said support.

24. The golf cart canopy system of claim 23, wherein said protective cover comprises a pair of curtains slidably fastened to said support by hook and loop fasteners.

25. The golf cart canopy system of claim 24, wherein said curtains comprise fastening ties for securing said curtains in a stored position.

26. The golf cart canopy system of claim 24, wherein each of said curtains comprises at least one hook and loop fastener extending along an edge of said curtains used to secure said curtains to each other.

27. A golf cart shield comprising:
 a body having first and second surfaces and first and second side walls extending between first and second ends;
 a pair of grooves extending laterally between said side walls;
 a pair of substantially C-shaped channels extending between said first and second ends;
 a raised portion formed in said first surface between said channels; and,
 at least one stop member secured to one of said side walls.

* * * * *